Nov. 17, 1936. B. McPHERSON Re. 20,173

CIGARETTE PACKAGE

Original Filed May 23, 1933

Inventor
Bruce McPherson

By

Attorney

Reissued Nov. 17, 1936 Re. 20,173

UNITED STATES PATENT OFFICE 20,173

CIGARETTE PACKAGE

Bruce McPherson, Greenville, S. C.

Original No. 1,944,098, dated January 16, 1934, Serial No. 672,476, May 23, 1933. Application for reissue November 30, 1934, Serial No. 755,499

12 Claims. (Cl. 206—48)

This invention relates to containers for cigarettes or cigarette packages and to novel means of securing the containers in folded condition and the object of the invention is to provide a container which is adapted to be folded about a package of cigarettes to protect the package and its contents against crushing and mutilation and to further provide the requisite number of matches, that most smokers would ordinarily need, in a folder which serves to secure the container in folded condition, all of which will be hereinafter more fully described and claimed.

Figure 1:
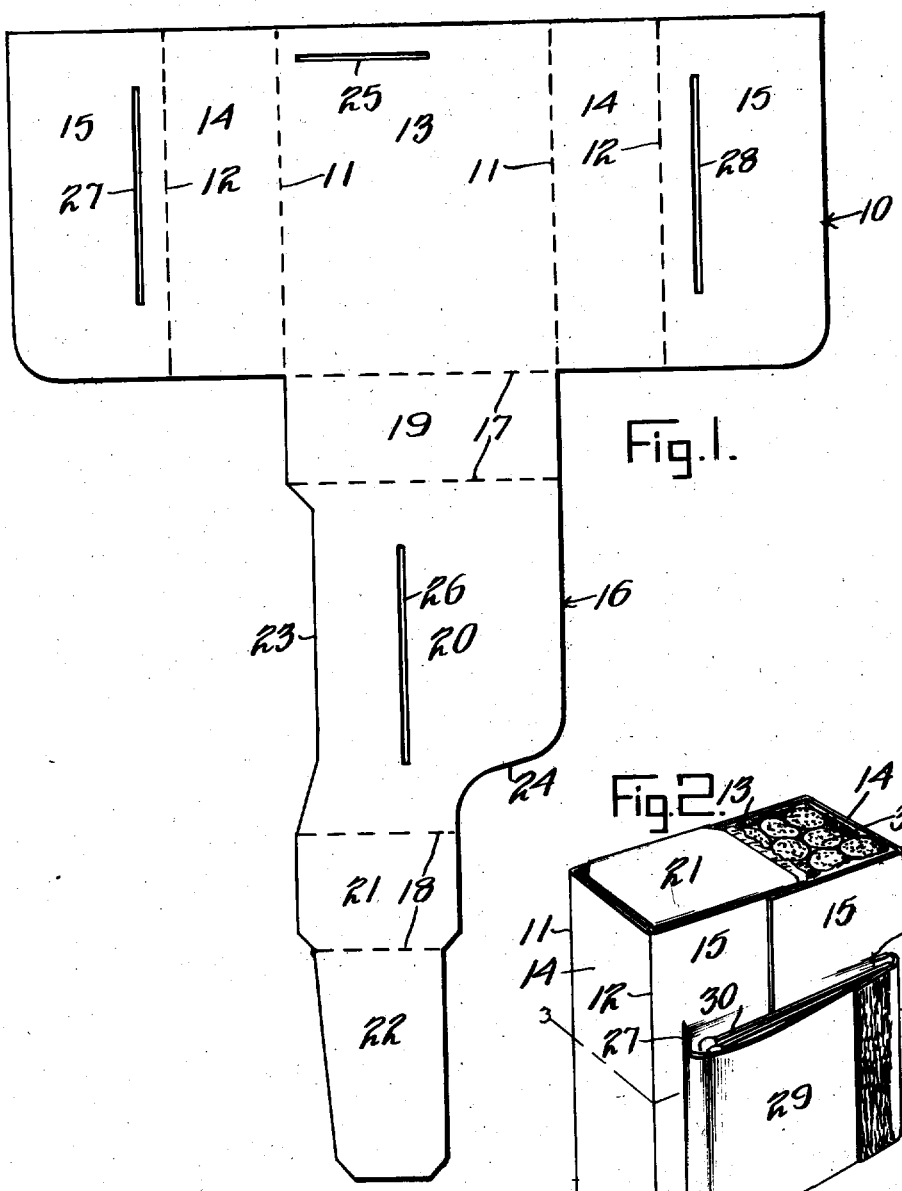
Figure 2:
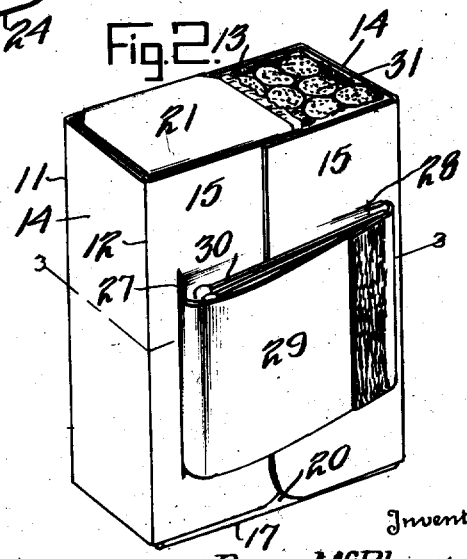
Figure 3:
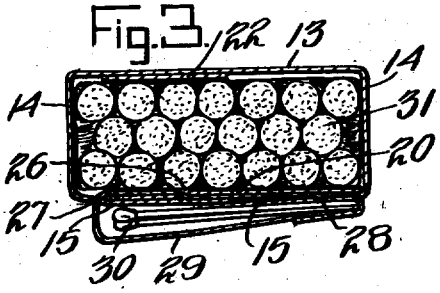

Referring to the accompanying drawing, which is made a part hereof and on which similar reference characters indicate similar parts, Figure 1 is a plan view of the blank from which the container is fashioned, Figure 2 a perspective view of the container, and Figure 3 a section on line 3—3 of Figure 2.

In the drawing reference numeral 10 indicates a portion of the blank, the main portion of which is substantially rectangular in shape and is divided by a series of parallel crease lines 11 and 12 forming the back 13, the sides 14 and the front flaps 15 of the container. The back 13 continues in an extended portion 16 which is likewise provided with a series of parallel crease lines 17 and 18 positioned perpendicular to the crease lines 11 and 12 and which divide the portion 16 to form the bottom 19, the front 20, the top 21 and the extended tab 22 of the container. The bottom 19 is of a length equal to the width of the back 13. The front 20 is cut back along the left edge 23 and the lower right corner 24 is cut in a curved fashion in such a manner that the length of the top 21 is about one-half of the length of the bottom 19 and the tab 22 is a width equal to the length of the slot 25 formed in the upper left hand corner of the back 13.

The front 20 is provided with a slot 26 located at the center and positioned parallel to the sides. The front flaps 15 are likewise provided with the slots 27 and 28 located on the outside of the crease lines 11 and 12 respectively and at a distance equal to the width of the cut back edge 23. The manner of folding and securing the container is as follows:

The blank of the container is formed of cardboard or any other material suitable for the purpose and is cut or stamped in the shape described above. The portion 16 is folded upwardly along the upper crease line 17 and over along the lower crease line 17 in such a manner that the front 20 is parallel to the back 13. The portion 16 is folded upwardly along the crease lines 11 and then inwardly along the crease lines 12 so that the front flaps 15 overlap each other, with the edge of the right flap beneath the left flap.

A match folder 29 of a type in common use and containing enough matches 30 for lighting the cigarettes in the package 31 enclosed in the container is employed to secure the container in folded position. The flap end of the match folder is pushed through the slot 28, over the front 20, into the slot 26 and then under the front 20 to the slot 27 where it is pulled through until the point of attachment of the matches is snugly positioned against slot 28 and the matches 30 rest on the front flaps 15. The flap of the folder may be tucked in or removed when it is desired to remove a match without affecting the locking of the parts of the container.

The top 21 is folded along the crease lines 18 in such a manner that the tab 22 extends over the upper edge of the back 13 into the slot 25, thus holding the package of cigarettes 31 in place in the container. The corner of the package of cigarettes may be torn away and the cigarettes removed through opening alongside the top 21 as clearly shown in Figure 2.

The utility of the container is quite evident, being well adapted for the main purpose of a convenient cigarette package but also for advertising purposes by printing thereon advertising matter and designs which would be novel, thus providing an inexpensive and effective medium of advertising.

It may be clearly seen that a neat package container results which not only affords protection for the package and contents, but provides a supply of matches to which access may be readily had and at the same time the match folder serves an additional function of locking the container in folded position.

It will be obvious to those skilled in the art that various changes may be made in my device without departing from the spirit of the invention, and therefore I do not limit myself to what is shown in the drawing and described in the specification, but only as indicated by the appended claims.

Having thus fully described my said invention, what I claim as new and desire to secure by Letters Patent, is:

1. A container for a package of cigarettes comprising a T-shaped blank, the ends of the top of the T adapted to be folded to form the sides and front flaps of said container and the leg of the T adapted to be folded to form the bottom, front, top and securing tab, said front flaps and front being provided with slots therein adapted to receive the free end of a match folder to hold said container in fixed position, substantially as set forth.

2. A container for a package of cigarettes comprising a T-shaped blank provided with a series of crease lines, the ends of the top of the T adapted to be folded along some of the crease lines to form the sides and front flaps of said container and the leg of the T adapted to be folded along other crease lines to form the bottom, front, top and securing tab, said front flaps and front being provided with slots therein adapted to receive the free end of a match folder to secure the parts together, said top being reduced in width to permit withdrawal of cigarettes from said container, substantially as set forth.

3. A container for a package of cigarettes comprising a blank formed of a rectangular portion and a portion perpendicular to the rectangular portion, the ends of the rectangular portion adapted to be folded inwardly to form the sides and front flaps of the container and the other portion adapted to be folded upon the rectangular portion to form the bottom, front, top and securing tab of said container, said front and front flaps being provided with slots formed therein to receive the end of a match folder to lock said parts in fixed position, substantially as set forth.

4. A container for a package of cigarettes comprising a blank formed of a rectangular portion and a portion perpendicular to the rectangular portion, the ends of the rectangular portion adapted to be folded inwardly to form the sides and front flaps of the container and the other portion adapted to be folded upon the rectangular portion to form the bottom, front, top and securing tab of said container, said front and front flaps being provided with slots formed therein to receive the end of a match folder to lock said parts in fixed position, said top being cut away to provide for easy removal of cigarettes from the container, substantialy as set forth.

5. A cardboard container for a pack of cigarettes comprising a blank formed of a rectangular portion and a portion extending from the center of one edge of said rectangular portion, the end of the rectangular portion adapted to be folded to form the sides and front flaps and the center to form the back of said container and the other portion adapted to be folded to form the bottom, front and top of said container, said front and front flaps being provided with slots through which the flap portion of a match folder may be inserted to hold the container in fixed position to receive a pack of cigarettes, the top of said container being reduced in width to form a partial top for said container and the extreme tip thereof adapted to be inserted in a slot formed in the back to hold the package in said container yet permit easy removal of the cigarettes therefrom, substantially as set forth.

6. A container comprising a back, sides and overlapping front flaps, each of said front flaps provided with a slot therein, said slots being spaced apart and parallel to each other adapted to receive the free end of a match folder to hold the container in fixed position, substantially as set forth.

7. The combination of a container and match folder comprising a back, sides and overlapping front flaps, each of said front flaps provided with a slot therein, said slots being spaced apart and parallel to each other, and a match folder having its flap portion extending through said slots to hold said container in fixed position, substantially as set forth.

8. A container for a package of cigarettes comprising a blank having a rectangular portion foldable to form a hollow substantially rectangular body adapted to fit snugly about the exterior of and substantially enclose a package of cigarettes, said blank also having an extending portion forming a closure means for both ends of the container, said portion at the end thereof remote from the body portion being of a width less than the width of the container thereby providing an opening through which access may be had to the contents of the container to afford removal of cigarettes therefrom.

9. A container for a package of cigarettes comprising a blank folded to form a substantially open-ended rectangular body, said blank also being provided with an extension of a length substantially greater than the length of the container and foldable to form closure means for the ends of the rectangular body, the closure means at the end of the extension remote from the body portion being of a width to provide an opening into the container whereby cigarettes may be removed from the cigarette package within the container.

10. A container for a package of cigarettes comprising a blank folded to form a substantially open-ended rectangular body, said blank also being provided with an extension of a length substantially greater than the length of the container and foldable to form closure means for the ends of the rectangular body, the closure means at the end of the extension remote from the body portion being of a width to provide an opening into the container whereby cigarettes may be removed from the cigarette package within the container, said blank being provided with slots for insertion of a match card.

11. A container for a package of cigarettes comprising a blank having a main body portion and an additional body portion extending angularly from the main body portion, the main body portion of the blank being foldable to form a box-like container to fit snugly about the exterior of the cigarette package and the angular portion being of a length substantially greater than the length of the container and being foldable providing two spaced end closure sections for the container, one of which is contiguous with the main body portion, and one of said end closure sections being of a width less than the width of the container to provide an opening affording access to the contents of a cigarette package positioned within the container.

12. A container for a package of cigarettes comprising a blank having a main body portion and an additional body portion extending angularly from the main body portion, the main body portion of the blank being folded to form a box-like container to snugly receive a cigarette package and the angular portion being of a length substantially greater than the length of the container and foldable to provide two spaced end closure sections for the container, one of which is contiguous to the main body portion and one of said end closure sections being formed to provide an opening affording access to the contents of a cigarette package positioned within the container.

BRUCE McPHERSON.